Dec. 3, 1935.  H. A. BULLOCK  2,022,705
APPARATUS FOR PRODUCING SOLID CARBON DIOXIDE
Filed Sept. 24, 1932  4 Sheets-Sheet 1

INVENTOR.
Harlon A. Bullock
BY
Hovey & Hamilton
ATTORNEYS.

Dec. 3, 1935.   H. A. BULLOCK   2,022,705
APPARATUS FOR PRODUCING SOLID CARBON DIOXIDE
Filed Sept. 24, 1932   4 Sheets-Sheet 2
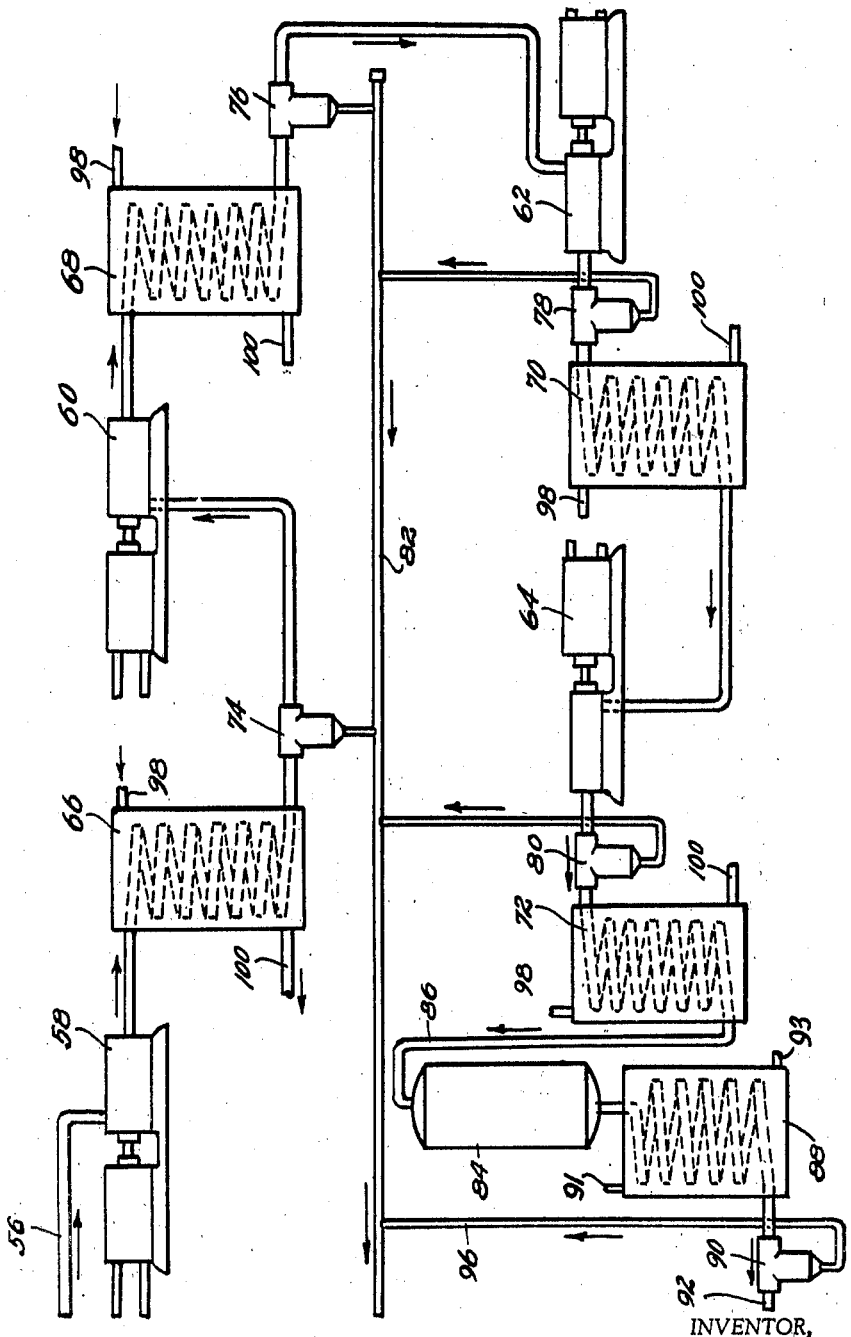

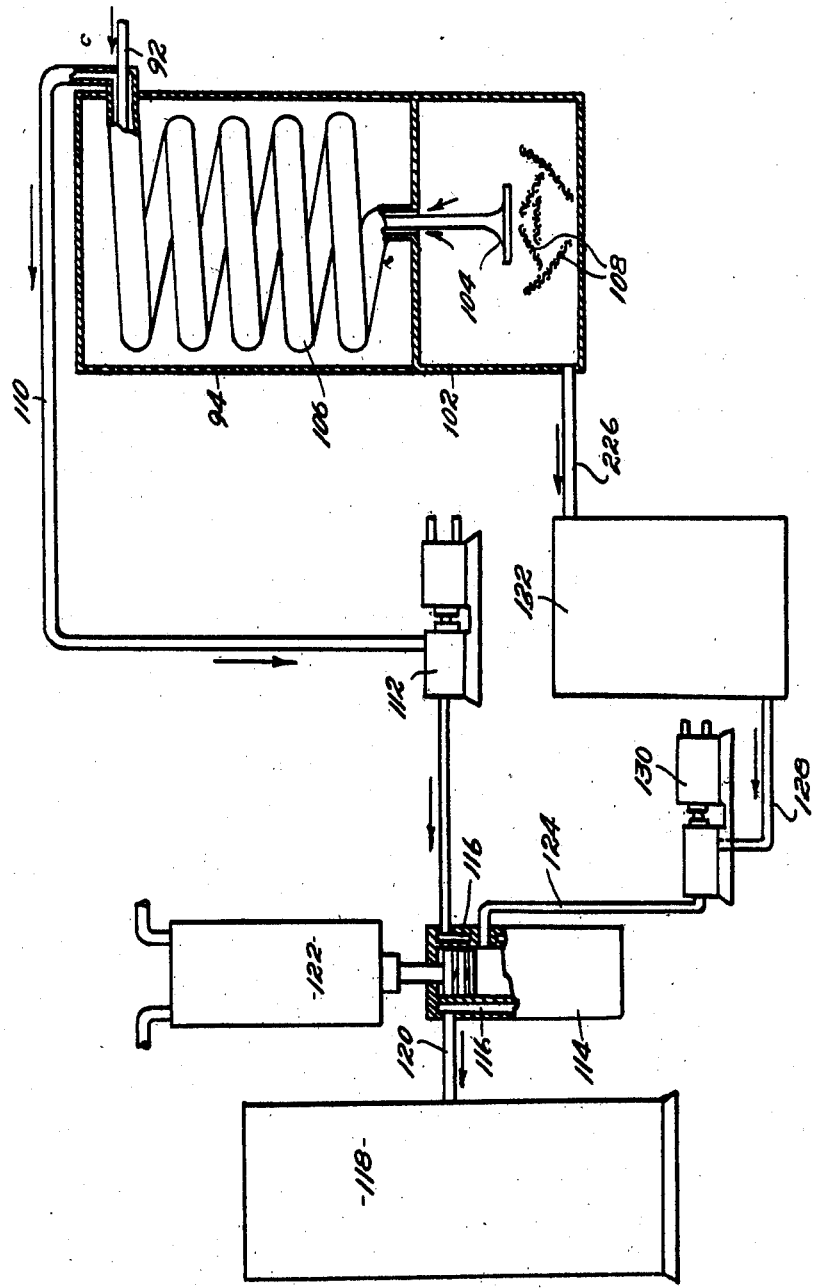

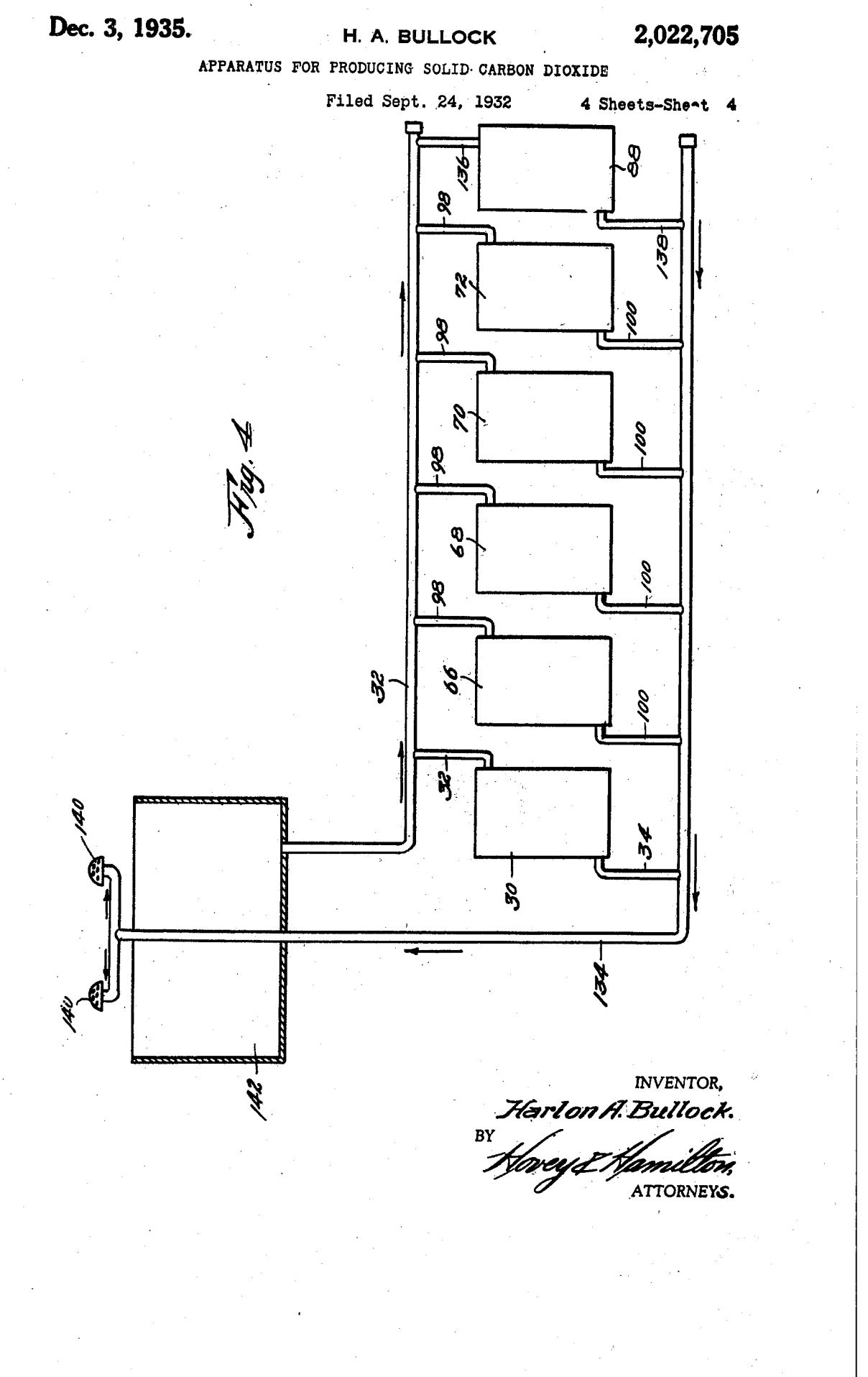

Dec. 3, 1935.   H. A. BULLOCK   2,022,705
APPARATUS FOR PRODUCING SOLID CARBON DIOXIDE
Filed Sept. 24, 1932   4 Sheets-Sheet 4

INVENTOR,
Harlon A. Bullock.
BY
Hovey & Hamilton,
ATTORNEYS.

Patented Dec. 3, 1935

2,022,705

UNITED STATES PATENT OFFICE 2,022,705

APPARATUS FOR PRODUCING SOLID CARBON DIOXIDE

Harlon A. Bullock, Kansas City, Mo.

Application September 24, 1932, Serial No. 634,626

1 Claim. (Cl. 62—121)

This invention relates to an improved method and apparatus for producing solidified carbon dioxide, commonly known as dry ice, and the primary object of the invention is the contemplation of such a method and apparatus, wherein is combined, in a unique and novel manner, pieces of apparatus and steps accomplished thereby which are effective in handling combustion gases to a point where the carbon dioxide or $CO_2$ is recovered, liquefied and compressed to create blocks of solidified carbon dioxide in a more efficient and expeditious way and without involving complicated and special equipment that results in undue expense.

One of the primary objects of the instant invention is to provide apparatus for producing solidified carbon dioxide which is susceptible of handling all of the combustion gases to the extent that inert gases contained therein are not removed nor separated from the carbon dioxide until immediately prior to solidification; at that point said inert gases being divided out for use as a refrigerant in the solidification machine receiving the liquefied carbon dioxide.

Another object of the invention is the provision of apparatus for producing solidified $CO_2$, wherein is embodied a plurality of compressors arranged in series, each having a cooler and condensate trap associated therewith, the condensate from said trap being carried to a reverse flow scrubber which acts upon combustion gases used in the system.

An even further object of the invention is to provide a method and apparatus of the character specified, wherein only solids and moisture are removed from combustion gases prior to compressing the same and prior to separating $CO_2$ from the remaining gases, said point of separation being at the time of liquefication on the part of the compressed carbon dioxide gas which is removed from the compressed combustion gases at this same point.

A further object of the invention is to provide novel means for baffling and acting upon the compressed combustion gases within the $CO_2$ liquefication chamber at the time inert gases are separated therefrom.

Having in mind that this invention contemplates an entirely new combination of elements and bearing in mind the many minor objects which will be brought forth during the course of the detailed specification, the preferred embodiment of the invention will be described by reference to the accompanying drawings, wherein apparatus utilized in practicing this invention is shown in diagrammatical form.

Fig. 2 is a similar view illustrating the series of compressors and their relation to a filter and after cooler.

Fig. 3 is a like view showing apparatus embodied in the final steps of the method, and, Fig. 4 is a diagrammatical showing of the common cooling means for all condensers and the like utilized in the system.

Figure 1:
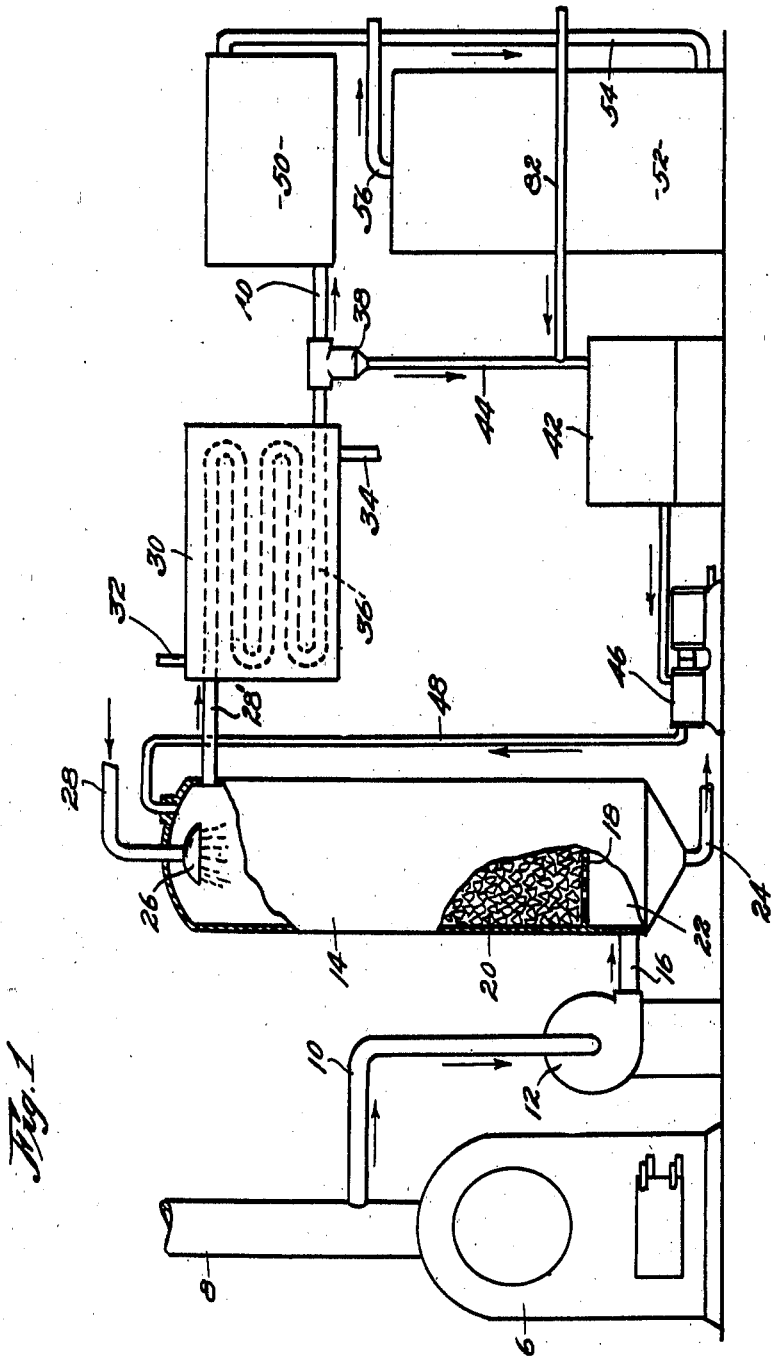
Figure 1 is a schematic view of the first few units of the system.

Figs. 1, 2, and 3 are continuations of each other in the sequence mentioned and for the purpose of understanding this invention it must be assumed that like pipes of these three views are interconnected, as will be more fully set down in the specification.

Like reference characters will be used to designate similar parts throughout the several views, and the numeral 6 indicates an ordinary gas producer, which may be a fire box or burner of natural gas having a stack 8 from which the gaseous products of combustion are drawn by pipe 10 through the action of suitable blower 12.

Blower 12 must have sufficient capacity to remove all combustion gases from stack 8 and must likewise create sufficient pressure to force these gases through scrubber 14 that is connected to blower 12 by pipe 16.

Scrubber 14 is of the reverse flow type, utilizing jets of water and charcoal or a similar filtering agent, all for the purpose of removing solid particles which are carried in suspension by the combustion gases. A grate 18 is spaced above the bottom of scrubber 14 to support the charcoal or similar filling 20 and likewise to create a water cooling chamber 22, from which water may be drawn through pipe 24 after it has moved downwardly through scrubber 14 against the flow of gas passing therethrough. A spray head 26 at the top of scrubber 14 receives a supply of water through connection 28, and when combustion gases pass from scrubber 14 through pipe 28', they are comparatively free from solids which would be objectionable in the later steps of the process.

These hot combustion gases may be passed into condenser 30 which receives a supply of cooling medium through cooling tower return line 32, and from which the cooling medium is drawn to cooling tower by pipe 34. Coils 36, housed within condenser 30, cause the hot and scrubbed gases to dwell within the condenser long enough to remove most of the moisture therein. This moisture collects in condensate trap 38, positioned in pipe 40, from whence it is drawn to condensate collection tank 42 through pipe 44 by pump 46. This pump serves to draw the collected condensate from all the traps of the system and such condensate is utilized in scrubber 14 by returning it thereto through pipe 48.

Thus the scrubbing water used in scrubber 14 is supplemented by the moisture carried by combustion gases passing therethrough.

Since this invention contemplates only the removal of solids and moisture from the combustion gases prior to compression, such action is desired to be as thorough as is posible, and to carry out this feature, a drier 50 is caused to act upon the gases immediately after their passing through condenser 30. This drier may be of a chemical nature and the purpose might be served by using a calcium chloride drier of well known type. At this point the thus treated combustion gases pass to a gasometer or gas receiving tank 52 through pipe 54 that leads from drier 50. From gasometer 52 pipe 56 conveys the combustion gases to the first stage of compression and at this point the diagram must be followed by referring to Fig. 2.

This invention contemplates four stages of compression, each acting upon the gases by sending the same through compressors 58, 60, 62, and 64. After each step of compression the compressed gases are sent through coolers 66, 68, 70, and 72, after which condensate formed within said four coolers is collected within traps 74, 76, 78, and 80. These traps are connected by a suitable piping 82 with condensate collection tank 42, previously described. From the last stage of compression, and after the gas passes from cooler 72, it is caused to enter filter 84 by way of pipe 86 for the purpose of removing any moisture, but more especially to separate therefrom oil which might have traveled to this point with the gas. An after cooler 88 then acts upon the gas, after which it enters trap 90 and passes to pipe 92 leading to gas separator 94. This separator is shown in Fig. 3.

Trap 90 is likewise connected with pipe line 82 through the medium of pipe 96 and thus all points wherein moisture is collected, with the exception of filter 84, are drained by pump 46 and the water sent into scrubber 14. Each of coolers 66, 68, 70, and 72 has a connection 98 with the hereinafter described cooling tower which carries cooled water thereto and a connection 100 with said tower which returns the water from each of said coolers after it has served the purpose of a cooling medium.

Reference to Fig. 3 will readily indicate the novel manner in which the gas is handled from this point on in the system. Gas separator 94 is caused to receive the compressed gas and a collecting chamber 102 allows the compressed gas to expand after it has been discharged from the outlet 104 formed at the end of pipe 92 which continues through pipe 106 in spaced relation thereto within gas separator 94. Pipe 106 forms a passage around pipe 92 in the coil housed by gas separator 94 and when the compressed gases expand in chamber 102, the inert gases carried by the compressed combustion gases are freed from the CO₂ which, by virtue of this expansion, liquefies as it is discharged from 104. Baffling takes place through the medium of a number of baffling screens 108, arranged as shown in Fig. 3. This baffling is an important step in effective separation of the gases and since the inert gases such as argon and nitrogen have not reached their liquefication points, the same passes through coiled pipe 106 and thence into pipe 110 to expansion engine 112.

The passage of these gases through coiled pipe 106 creates a refrigerating action upon the inflowing compressed gases of combustion, and after these separated gases pass through pipe 110, they are sent to solidification machine 114, through the surrounding compartment 116 thereof, and thence to tank 118 by way of pipe 120, where they may be exhausted or used as desired. These gases are used in solidification machine 114 as a refrigerant for the liquid CO₂ which is pressed into blocks therein. A suitable power cylinder 122 is used to press the liquid CO₂ within solidification machine 114 after it is pumped thereto through pipes 124, 126, 128 by utilizing pump 130. A tank 132 might be used to store the cooled liquefied carbon dioxide if desired.

Fig. 4 represents the manner of interconnecting all of coolers 66, 68, 70, and 72, after cooler 88 and condenser 30 to a single cooling tower. Water is carried to these units through pipe 32 and after passing therethrough is returned to the cooling tower through pipe 134. Branches 136 and 138 lead directly from after cooler from and to pipes 32 and 134 respectively and the cooling tower proper may be of any suitable construction so long as the necessary elements are present. Spray heads 140 break up the stream of water before its return to catch basin 142.

There should be a sufficient number of solidification machines to conserve the supply of liquefied carbon dioxide, and suitable insulation and cold resisting materials should be employed throughout the system.

The operation of the apparatus throughout a system embodying this invention is obvious from the foregoing. It is notable that a large volume of nitrogen is present in this method of treating combustion gases, and due to this fact all compressors must be of a size sufficient to handle the full amount of combustion gas sent through the lines. It is not eliminated until the CO₂ liquefies and, for this reason, the equipment used must be heavier in proportion to the amount of solidified CO₂ produced than if the inert gases or nitrogen alone were removed at a time prior to compression before liquefication of the carbon dioxide.

Compressed CO₂ in liquid state is evaporated in after cooler 88 to cool the CO₂ liquid destined for the solidifier to a temperature of $-10$ degrees F. When the said compressed gases of combustion enter separator 94 they are, therefore, at a temperature of substantially $-10$ degrees F. and at a pressure from 1750 to 1800 pounds. A material and sudden drop in pressure within expansion chamber 102 drops the temperature to liquefy the CO₂.

In practice, if coolers 66, 68, 70, and 72 accomplish their work fully, after cooler 88 will not be necessary and may be entirely eliminated.

Any suitable equipment might be used in establishing the system contemplated by this invention, and structural details altered without departing from the spirit thereof or the scope of the appended claim.

Having thus described the invention, what is claimed as new and desired to be secured by Letters Patent is:

In apparatus for producing solid carbon dioxide, a plurality of compressors; means for delivering gaseous products of combustion to the compressors; a gas separator including a collecting and expansion chamber for liquefying the carbon dioxide gas and removing inert gases therefrom; a solidification machine for the liquefied carbon dioxide; and means for further cooling the inert gases and for conveying them to said solidification machine to act as a refrigerant for the said liquefied carbon dioxide and for the solid when compressed.

HARLON A. BULLOCK.